(12) United States Patent
Cropper et al.

(10) Patent No.: US 11,212,125 B2
(45) Date of Patent: Dec. 28, 2021

(54) ASSET MANAGEMENT WITH RESPECT TO A SHARED POOL OF CONFIGURABLE COMPUTING RESOURCES

(71) Applicant: International Business Machines Corporation, Armonk, NY (US)

(72) Inventors: Joseph W. Cropper, Rochester, MN (US); Taylor D. Peoples, Austin, TX (US); Jeffrey W. Tenner, Rochester, MN (US); Andrew T. Thorstensen, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 626 days.

(21) Appl. No.: 15/017,555

(22) Filed: Feb. 5, 2016

(65) Prior Publication Data

US 2017/0230306 A1    Aug. 10, 2017

(51) Int. Cl.
*H04L 12/14* (2006.01)
*H04L 29/08* (2006.01)
*G06F 9/50* (2006.01)
*H04M 15/00* (2006.01)

(52) U.S. Cl.
CPC ........ *H04L 12/1428* (2013.01); *G06F 9/5083* (2013.01); *H04L 67/1012* (2013.01); *H04L 67/34* (2013.01); *H04M 15/00* (2013.01); *H04M 15/44* (2013.01); *H04M 15/765* (2013.01); *G06F 2209/5011* (2013.01)

(58) Field of Classification Search
CPC ............... H04L 47/765; H04L 12/1428; H04L 67/1012; H04L 67/34
USPC .......................................................... 709/226
See application file for complete search history.

(56) References Cited

U.S. PATENT DOCUMENTS

| 8,527,988 B1 | 9/2013 | Rhine |
| 8,539,499 B1 | 9/2013 | Tovpeko et al. |
| 9,129,435 B2 | 9/2015 | Lee et al. |
| 2008/0270199 A1* | 10/2008 | Chess ................ G06F 9/505 705/7.26 |
| 2009/0064156 A1 | 3/2009 | He et al. |

(Continued)

OTHER PUBLICATIONS

Mell, Peter, et al., The NIST Definition of Cloud Computing, National Institute of Standards and Technology, Oct. 7, 2009, Version 15, NIST, Gaithersburg, MD, US.

(Continued)

*Primary Examiner* — Meng Vang
(74) *Attorney, Agent, or Firm* — Nathan M. Rau (57) ABSTRACT

Disclosed aspects relate to asset management with respect to a shared pool of configurable computing resources. With respect to a set of assets which share a resource on a first compute node, a set of asset weight values is identified. The set of asset weight values indicates a set of utilization shares of the resource by the set of assets. A set of asset priority values is identified with respect to the set of assets on the first compute node. The set of asset priority values indicates a relative status arrangement for the set of assets. Using the set of asset weight values and the set of asset priority values, a determination is made to migrate a first asset of the set of assets from the first compute node to a second compute node. Accordingly, the first asset of the set of assets is migrated from the first compute node to the second compute node.

18 Claims, 7 Drawing Sheets

(56) References Cited

U.S. PATENT DOCUMENTS

| | | | | |
|---|---|---|---|---|
| 2009/0169020 | A1* | 7/2009 | Sakthikumar | G06F 21/57 380/278 |
| 2009/0193122 | A1* | 7/2009 | Krishamurthy | G06F 9/5088 709/226 |
| 2009/0271646 | A1* | 10/2009 | Talwar | G06F 1/3203 713/322 |
| 2010/0306382 | A1* | 12/2010 | Cardosa | G06F 9/5044 709/226 |
| 2011/0202640 | A1* | 8/2011 | Pillutla | G06F 9/5077 709/221 |
| 2012/0180045 | A1* | 7/2012 | Bhogal | G06F 9/50 718/1 |
| 2013/0080641 | A1* | 3/2013 | Lui | H04L 67/10 709/226 |
| 2014/0053151 | A1 | 2/2014 | Heninger et al. | |
| 2014/0173113 | A1 | 6/2014 | Vemuri et al. | |
| 2014/0189441 | A1* | 7/2014 | Ishida | G06F 11/3006 714/47.3 |
| 2014/0208329 | A1* | 7/2014 | Abali | G06F 9/45533 718/104 |
| 2015/0212856 | A1* | 7/2015 | Shanmuganathan | G06F 9/5027 709/226 |

OTHER PUBLICATIONS

Jiang, C-F. et al.; "Resource allocation in contending virtualized environments through stochastic virtual machine performance modeling and feedback"; Journal of Information Science and Engineering, vol. 29, No. 2, pp. 299-327; Mar. 2013.

Moses, J. et al.; "Shared Resource Monitoring and Throughput Optimization in Cloud-Computing Data Centers"; Proceedings of the 25th IEEE International Parallel & Distributed Processing Symposium, pp. 1024-1033; IEEE Computer Society; 2011.

Anonymously; "VM Migration based on multi criterion ranking of Hypervisors and Virtual Machines in Software Defined Data Center (SDDC) Environments"; http://ip.com/IPCOM/000240063; Dec. 29, 2014.

Anonymously; "Management framework for efficient live migration of virtual machines running migration-aware applications"; http://ip.com/IPCOM/000200260; Oct. 3, 2010.

Anonymously; "Intelligent VM Migration Based on Relative VM Priority and Relative Suitability of Migration Target"; http://ip.com/IPCOM/000201632; Nov. 16, 2010.

IBM; "Method and mechanism to use prioritized classes as an optimization for shared processor partitioning resource usage"; http://ip.com/IPCOM/000181074; Mar. 25, 2009.

VMware, "Resource Management with VMware DRS", VMware Best Practices, Revision 20061122 Version: 1.1 Item: VI-ENG-Q206-238, Copyright © 1998-2006 VMware, Inc., pp. 1-24, <http://www.vmware.com/pdf/vmware_drs_wp.pdf>.

Nagios, "Nagios—Network, Server and Log Monitoring Software", Nagios, Accessed on Jul. 11, 2017 2:38 PM, Copyright © 2009-2017, pp. 1-5, <https://www.nagios.com/>.

OpenStack, "Ceilometer", OpenStack, Captured May 1, 2013, pp. 1-3,<https://web.archive.org/web/20130501111940/https://wiki.openstack.org/wiki/Ceilometer>.

Hambling, David, "Drone swarms will change the face of modern warfare", WIRED, Jan. 7, 2016, pp. 1-22, <http://www.wired.co.uk/article/drone-swarms-change-warfare>.

Reagan, Jason, "Techie Relief Group Unveils New Drone Swarm System", drone life, Jan. 15, 2016, pp. 1-2, <http://dronelife.com/2016/01/15/techie-relief-group-unveils-new-drone-swarm-system/>.

* cited by examiner

ASSET MANAGEMENT WITH RESPECT TO A SHARED POOL OF CONFIGURABLE COMPUTING RESOURCES

BACKGROUND

This disclosure relates generally to computer systems and, more particularly, relates to asset management with respect to a shared pool of configurable computing resources. The amount of data that needs to be managed by enterprises is increasing. Asset management may be desired to be performed as efficiently as possible. As data needing to be managed increases, the need for efficient asset management may increase.

SUMMARY

Disclosed aspects relate to asset management pertaining to performing ongoing efficiency operations in a shared pool of configurable computing resources. As such, ongoing operations corresponding to one or more assets may positively impact resource distribution challenges related to processor, memory, input-output, or bandwidth factors. With respect to a set of assets which share a resource on a first compute node, a set of asset weight values is identified. The set of asset weight values indicates a set of utilization shares of the resource by the set of assets. A set of asset priority values is identified with respect to the set of assets on the first compute node. The set of asset priority values indicates a relative status arrangement for the set of assets. Using the set of asset weight values and the set of asset priority values, a determination is made to migrate a first asset of the set of assets from the first compute node to a second compute node. Accordingly, the first asset of the set of assets is migrated from the first compute node to the second compute node.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to an asset (e.g., virtual machine) selection process when performing ongoing efficiency operations (e.g., optimization, maintenance) of a cloud environment. Accordingly, ongoing optimization or maintenance using live migrations of virtual machines may positively impact resource distribution challenges related to processor, memory, input-output, or bandwidth factors. A methodology which uses information about the assets/workloads to determine which virtual machine to migrate may have performance or efficiency benefits related to at least one factor. To illustrate, consider the illustrative example of a resource distribution challenge that follows.

Consider if a user (or administrator) desires to optimize a cloud environment with respect to processor utilization. The user may have provided a threshold of 70% processor utilization beyond which optimization may be indicated, flagged, or desired (e.g., once a compute node reaches this level, the compute node is deemed to need maintenance such as optimization in the form of a migration). A compute node in the cloud environment has 100 virtual machines deployed to it. After a period of time the processor utilization of the compute node exceeds the 70% threshold. Accordingly, an optimization engine is run and it is decided that any virtual machine on the compute node may be migrated to a destination compute node in order to attempt to resolve the threshold processor utilization event. The first virtual machine in a list may be migrated, thereby addressing the threshold processor utilization event for the compute node.

However, because the first virtual machine in the list had a large asset weight value (e.g., 255), that virtual machine can consume significantly more resources on the destination compute node than at least one of the alternatives would have (e.g., another virtual machine with a small asset weight value such as 5). In some instances, a virtual machine may migrate back and forth (e.g., "ping-pong") between compute nodes, or the virtual machine may be repetitively/continuously migrated (e.g., because the virtual machine is generating significant processor, memory or input-output traffic on its current compute node). Various embodiments described herein can be utilized to provide more predictable impacts to destination compute nodes in response to a virtual machine arriving via live migration while also positively impacting overall reliability (e.g., decreasing the impact of error events or operations such as migrations) with respect to the cloud environment.

Aspects of the disclosure include a method, system, and computer program product for asset management (e.g., in an automated fashion without user intervention) with respect to a shared pool of configurable computing resources. With respect to a set of assets (e.g., virtual machines, logical partitions) which share a resource (e.g., processor allocation, processor capacity remainder) on a first compute node, a set of asset weight values is identified. The set of asset weight values indicates a set of utilization shares of the resource by the set of assets. In embodiments, the set of utilization shares indicates an allocation of the processor capacity remainder to the set of assets. A set of asset priority values is identified with respect to the set of assets on the first compute node.

The set of asset priority values indicates a relative status arrangement for the set of assets.

Using the set of asset weight values and the set of asset priority values, a determination is made to migrate a first asset of the set of assets from the first compute node to a second compute node. The determination may be made to balance the set of asset weight values and the set of asset priority values with respect to the first and second compute nodes. Accordingly, the first asset of the set of assets is migrated from the first compute node to the second compute node. The migration may include a live migration that is performed by a native operating system. In various embodiments, the migration occurs in response to detecting a triggering event. The triggering event can include achieving a threshold temporal period, achieving a threshold resource utilization, achieving a threshold expected-error-event-impact value, or a change to the set of assets. Altogether, performance or efficiency benefits with respect to a shared pool of configurable computing resources may occur (e.g., speed, flexibility, load balancing, responsiveness, resource usage, productivity). Aspects may save resources such as bandwidth, processing, or memory.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 1:
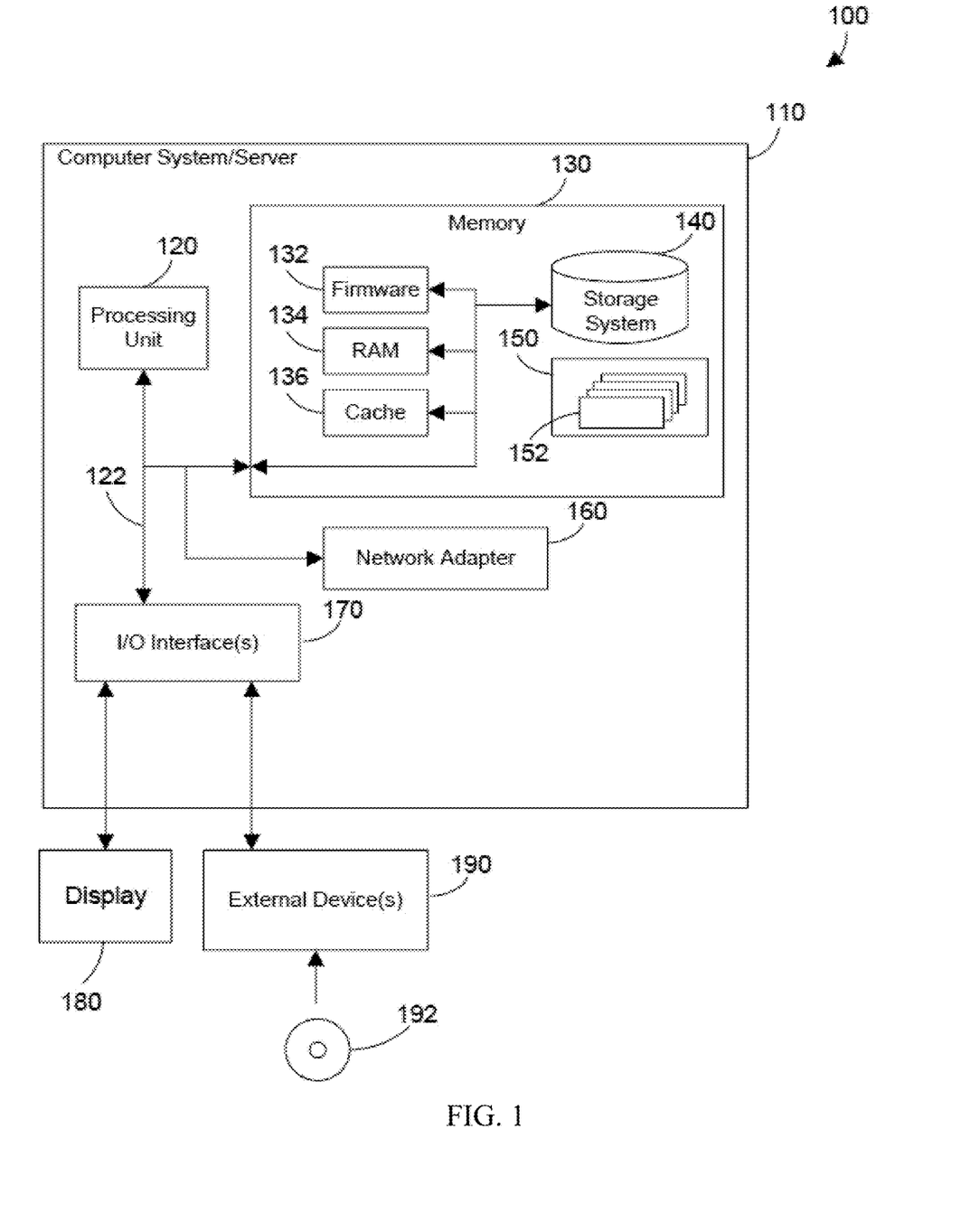
FIG. 1 depicts a cloud computing node according to embodiments.

Referring now to FIG. 1, a block diagram of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 110, which is operational with numerous other general purpose or special purpose computing system environments or configurations. Examples of well-known computing systems, environments, and/or configurations that may be suitable for use with computer system/server 110 include, but are not limited to, personal computer systems, server computer systems, tablet computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 110 may be described in the general context of computer system executable instructions, such as program modules, being executed by a computer system. Generally, program modules may include routines, programs, objects, components, logic, data structures, and so on that perform particular tasks or implement particular abstract data types. Computer system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 110 in cloud computing node 100 is shown in the form of a general-purpose computing device. The components of computer system/server 110 may include, but are not limited to, one or more processors or processing units 120, a system memory 130, and a bus 122 that couples various system components including system memory 130 to processing unit 120.

Bus 122 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 110 typically includes a variety of computer system readable media. Such media may be any available media that is accessible by computer system/server 110, and it includes both volatile and non-volatile media, removable and non-removable media. An example of removable media is shown in FIG. 1 to include a Digital Video Disc (DVD) 192.

System memory 130 can include computer system readable media in the form of volatile or non-volatile memory, such as firmware 132. Firmware 132 provides an interface to the hardware of computer system/server 110. System memory 130 can also include computer system readable media in the form of volatile memory, such as random access memory (RAM) 134 and/or cache memory 136. Computer system/server 110 may further include other removable/non-removable, volatile/non-volatile computer system storage media. By way of example only, storage system 140 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 122 by one or more data media interfaces. As will be further depicted and described below, memory 130 may include at least one program product having a set (e.g., at least one) of program modules that are configured to carry out the functions described in more detail below.

Program/utility 150, having a set (at least one) of program modules 152, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 152 generally carry out the functions and/or methodologies of embodiments of the invention as described herein.

Computer system/server 110 may also communicate with one or more external devices 190 such as a keyboard, a pointing device, a display 180, a disk drive, etc.; one or more devices that enable a user to interact with computer system/server 110; and/or any devices (e.g., network card, modem, etc.) that enable computer system/server 110 to communicate with one or more other computing devices. Such communication can occur via Input/Output (I/O) interfaces 170. Still yet, computer system/server 110 can communicate with one or more networks such as a local area network (LAN), a general wide area network (WAN), and/or a public network (e.g., the Internet) via network adapter 160. As depicted, network adapter 160 communicates with the other components of computer system/server 110 via bus 122. It should be understood that although not shown, other hardware and/or software components could be used in conjunction with computer system/server 110. Examples, include, but are not limited to: microcode, device drivers, redundant processing units, external disk drive arrays, Redundant Array of Independent Disk (RAID) systems, tape drives, data archival storage systems, etc.

Figure 2:
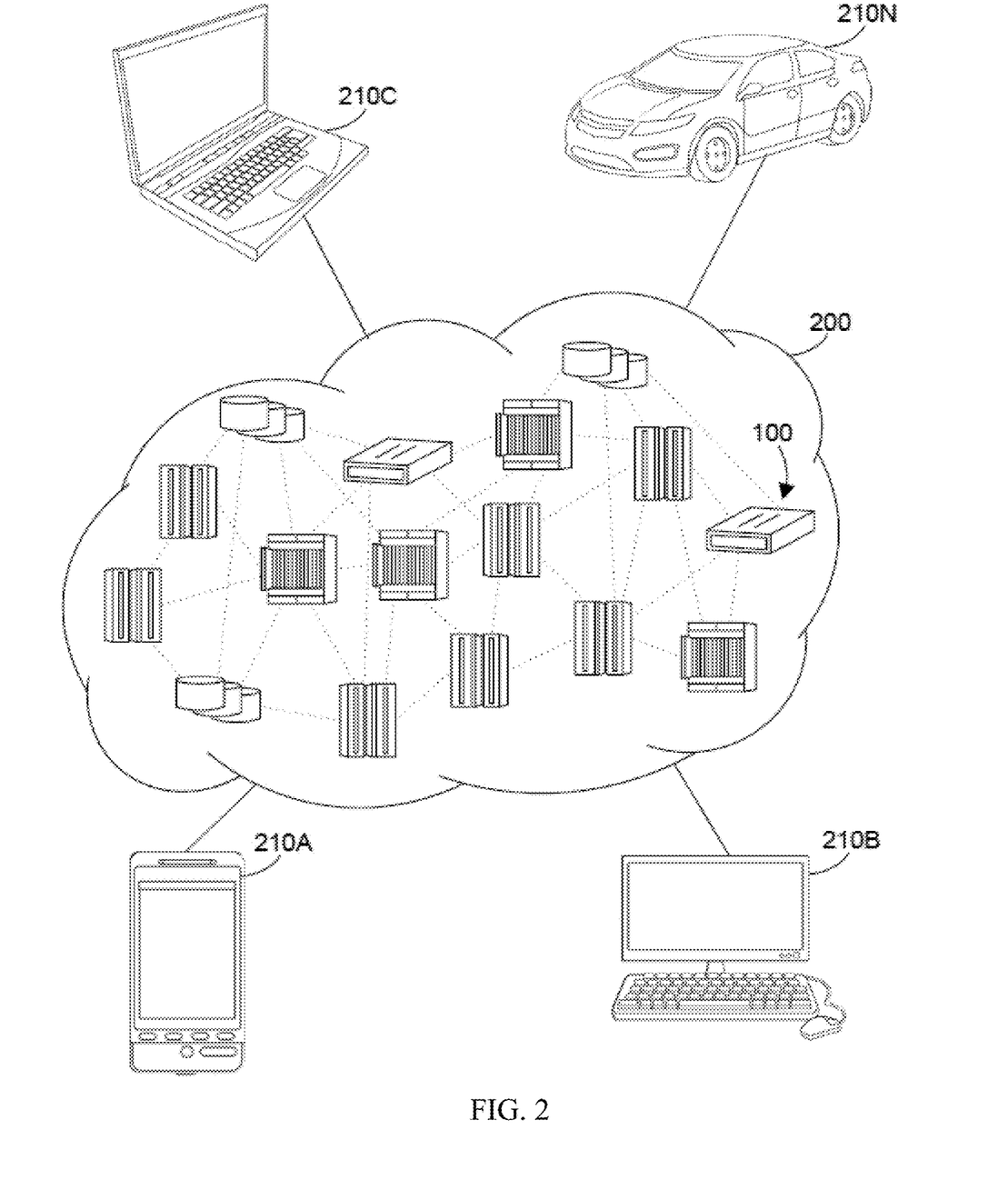
FIG. 2 depicts a cloud computing environment according to embodiments.

Referring now to FIG. 2, illustrative cloud computing environment 200 is depicted. As shown, cloud computing environment 200 comprises one or more cloud computing nodes 100 with which local computing devices used by cloud consumers, such as, for example, personal digital assistant (PDA) or cellular telephone 210A, desktop computer 210B, laptop computer 210C, and/or automobile computer system 210N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 210A-N shown in FIG. 2 are intended to be illustrative only and that computing nodes 100 and cloud computing environment 200 can communicate with any type of computerized device over any type of network and/or network addressable connection (e.g., using a web browser).

Figure 3:
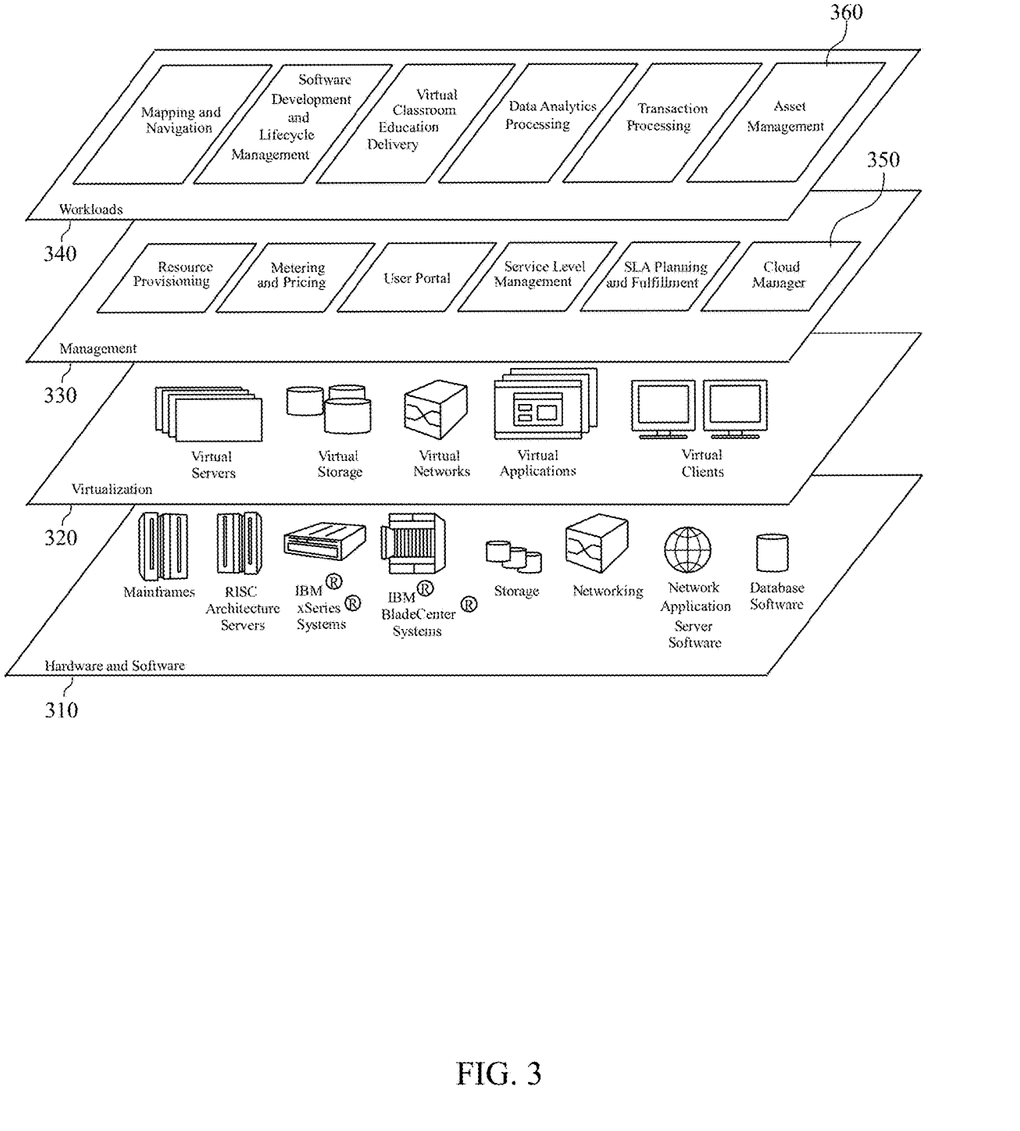
FIG. 3 depicts abstraction model layers according to embodiments.

Referring now to FIG. 3, a set of functional abstraction layers provided by cloud computing environment 200 in FIG. 2 is shown. It should be understood in advance that the components, layers, and functions shown in FIG. 3 are intended to be illustrative only and the disclosure and claims are not limited thereto. As depicted, the following layers and corresponding functions are provided.

Hardware and software layer 310 includes hardware and software components. Examples of hardware components include mainframes, in one example IBM System z systems; RISC (Reduced Instruction Set Computer) architecture based servers, in one example IBM System p systems; IBM System x systems; IBM BladeCenter systems; storage devices; networks and networking components. Examples of software components include network application server software, in one example IBM Web Sphere® application server software; and database software, in one example IBM DB2® database software. IBM, System z, System p, System x, BladeCenter, WebSphere, and DB2 are trademarks of International Business Machines Corporation registered in many jurisdictions worldwide.

Virtualization layer 320 provides an abstraction layer from which the following examples of virtual entities may be provided: virtual servers; virtual storage; virtual networks, including virtual private networks; virtual applications and operating systems; and virtual clients.

In one example, management layer 330 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A cloud manager 350 is representative of a cloud manager (or shared pool manager) as described in more detail below. While the cloud manager 350 is shown in FIG. 3 to reside in the management layer 330, cloud manager 350 can span all of the levels shown in FIG. 3, as discussed below.

Workloads layer 340 provides examples of functionality for which the cloud computing environment may be utilized. Examples of workloads and functions which may be provided from this layer include: mapping and navigation; software development and lifecycle management; virtual classroom education delivery; data analytics processing; transaction processing; and asset management 360, which may be utilized as discussed in more detail below.

Figure 4:
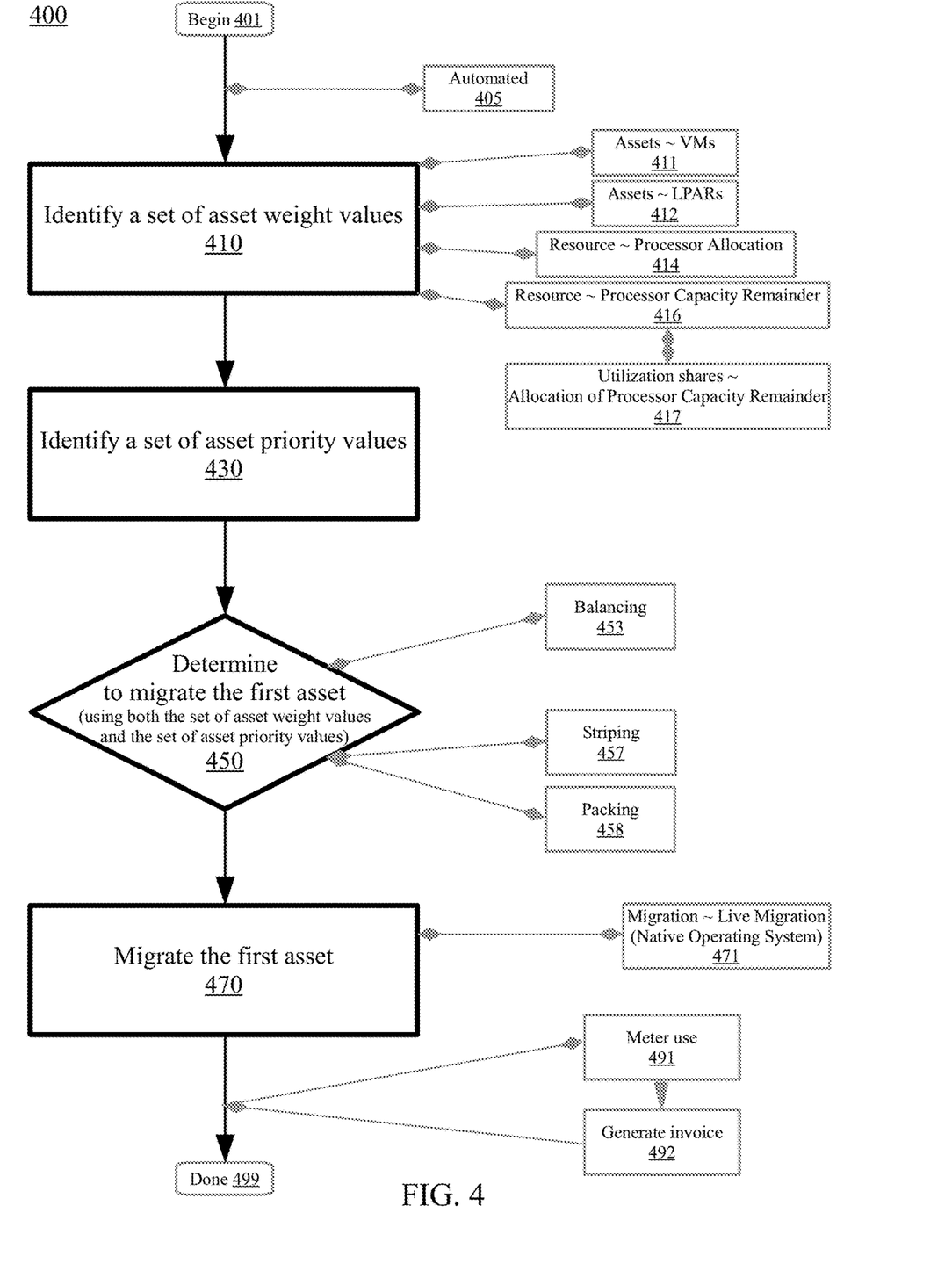
FIG. 4 is a flowchart illustrating a method for asset management with respect to a shared pool of configurable computing resources according to embodiments.

FIG. 4 is a flowchart illustrating a method for asset management with respect to a shared pool of configurable computing resources according to embodiments. Aspects may use a set of asset weight values to determine an impact on a resource utilization value (e.g., processor utilization) or a set of asset priority values to spread/balance assets to deter having above a threshold number of important/essential assets on a same host. Method 400 may begin at block 401. In embodiments, an asset manager may be used to manage a set of operations in an automated fashion (e.g., by a computer hardware processor) at block 405 without user intervention as described herein. Automation can reduce potential or actual error events, and save time of users or administrators which can positively impact an overall computing efficiency or performance. The asset manager may be included in a cloud or shared pool manager, or may be separate. As such, identifying the set of asset weight values, identifying the set of asset priority values, determining to migrate the first asset, and migrating the first asset may each occur in an automated fashion without user intervention.

At block 410, a set of asset weight values is identified. The identification/detection occurs with respect to a set of assets which share (e.g., assigned/use at least a portion of) a resource on a first compute node. The set of asset weight values may indicate a set of utilization shares of the resource by the set of assets. The set of assets can include a set of virtual machines (VMs) at block 411, or a set of logical partitions (LPARs) at block 412. For example, the set of virtual machines can include a system virtual machine providing a complete system platform which supports the execution of a complete operating system. The virtual machine can include a process virtual machine that is designed to run a single program (e.g., supporting a single process). Other assets are contemplated such as various software application programs. The resource (e.g., processor, memory, bandwidth) may include a processor allocation (e.g., processor power, 2 gigahertz) at block 414 or a processor capacity remainder (e.g., leftover processor power, 8 cores, 30% of the total capacity) at block 416. Similar features may be used for memory or bandwidth. The set of utilization shares (e.g., representing a proportion, 10%, 10 shares out of 100) can indicate an allocation of the processor capacity remainder (e.g., proportion of the leftovers) to the set of assets at block 417.

For example, the set of asset weight values may be related to the hypervisor level. The set of assets on a server that runs a shared processing mode (e.g., can share processors with other assets) may have an assigned or learned weight value (e.g., 0-255) which can be used to determine how much of the extra/remaining processor capacity that the asset receives relative to others. For instance, if there are three uncapped virtual machines with asset weight values of 1, 128, and 255 respectively, the partition with a weight of 255 can be allocated 255/(1+128+255) of the remaining resources (e.g., approximately 66%).

At block 430, a set of asset priority values is identified. The identification/detection occurs with respect to the set of assets on the first compute node. The set of asset priority values may indicate a relative status arrangement for the set of assets. The set of asset priority values can include a sorting, ordering, or ranking associated with (each of) the set of assets and may be integers or other numerical representations. For instance, virtual machines may be ranked from 1 to n in order to comparatively prioritize certain virtual machines relative to others. Thus, the relative status arrangement for the set of assets may be determined by the sorting, ordering, or ranking by filtering in ascending or descending magnitude (e.g., order of importance, vitality, or potential/actual cost).

For example, the set of asset priority values may be related to the hypervisor level. The set of assets on a server can have an assigned or learned priority value (e.g., 0-255) which can be used to determine which assets can be operated-on (e.g., proactively powered-off) in response to an error event (e.g., physical processor failure on a host). Accordingly, more highly valued workloads may stay running longer than lesser valued workloads in response to the error event.

At block 450, it is determined to migrate a first asset of the set of assets from the first compute node to a second compute node. The determination can be made using both the set of asset weight values and the set of asset priority values. Determining can include calculating, computing, ascertaining, evaluating, formulating, or comparing. The set of asset weight values are associated with resource utilization as a more heavily weighted asset will be expected to use more resources (because more remainder resources have been assigned to it). The set of asset priority values can assist in keeping more prominent assets running. In embodiments, an algorithm may factor-in both the set of asset weight values and the set of asset priority values to balance (e.g., spread, spray) them with respect to the first and second compute nodes at block 453.

For example, consider a shared pool of configurable computing resources with 100 assets. The algorithm may seek to split the first 50 assets by asset priority value between the first compute node and the second compute nodes. In general, 5 of the top 10 to the first asset and the other 5 of the top 10 to the second asset, and so on until the first 50 assets are balanced between the first and second compute nodes. The last 50 assets may be assigned based on asset weight value so that processor utilization is relatively equitable (e.g., within a 10% threshold) between the first and second compute nodes when factoring in all of the asset weight values. As assets are hibernated, removed, resized, etc., the migration action described may prove useful to (re)balance the set of asset weight values and the set of asset priority values. Such balancing may be done automatically without user intervention, and may be applied to a shared pool of configurable computing resources while assets are running. Other possibilities are contemplated, such as scaling/weighting the set of asset weight values and the set of asset priority values (e.g., multiplying the set of asset weight values by a number such as 5 and the set of asset priority values by a number such as 2 and then adding them together to select an asset to migrate based on a sorted ranking of the resultant numbers) or alternating considering the set of asset weight values and the set of asset priority values as a primary factor when determining which asset to migrate (e.g., a migration pattern which accounts for one of the values for a first migration and then accounts for the other of the values for a second migration).

In embodiments, the determination to migrate the first asset may be made based on a striping criterion at block 457. The striping criterion may, for example, arrange the set of assets (relatively) evenly across hosts in the shared pool of configurable computing resources. In general, the striping criterion may spread the computing impact of the set of assets across various physical hosts (e.g., having a few compute nodes as possible with significantly higher asset weight/priority values than others). As such, the first asset may be selected when the first compute node has too high of an aggregate of asset weight values or asset priority values relative to other compute nodes. The second compute node may be selected to receive the first asset when its cumulative asset weight values or asset priority values are lower than other compute nodes (e.g., lower than a threshold, lower than the mean, lower than a quartile). Aspects of using the striping criterion may have positive impacts on burden/load-balancing (e.g., relative to other methodologies).

In embodiments, the determination to migrate the first asset may be made based on a packing criterion at block 458. The packing criterion, for example, may arrange the set of assets such that assets of within a range (e.g., top 10%, bottom 7 assets, middle 28% of assets, assets rated as greater than one standard deviation of the mean) of the relative status arrangement or the set of utilization shares are located on a particular set of compute nodes. For instance, a chunk methodology may migrate as many of the more highly valued asset priority values onto the second compute node as possible (e.g., if the second compute node has a lesser likelihood of an error event). Similarly, assets with lesser valued asset priority values can be migrated from the first compute node if the first compute node is highly reliable (e.g., to make space for more assets with higher valued asset priority values). By packing assets in chunks based on rating-values, it may be less likely that any one of the higher-valued assets is impacted (e.g., because they are on a compute node less likely to experience an error event such as having a sufficient backup configuration). As another example, assets with utilization shares below a threshold may be packed-together and migrated to a lesser-reliable compute node (e.g., a lot of assets with lesser processing requirements individually may recover from an error event more efficiently/effectively than other asset arrangements).

At block 470, the first asset of the set of assets is migrated from the first compute node to the second compute node. In embodiments, the migration includes a live migration that is performed by a native operating system (e.g., a native hypervisor which runs directly on compute node hardware) at block 471. A particular asset of the set of assets may be copied from a first location to a second location (e.g., set-up for storage/processing on a different machine). The particular asset of the set of assets can be removed (e.g., deleted) from the first location. For example, a project may have a variety of stages, where a first stage has a first asset being more reliably run on a first compute node and a second stage is more reliably run on a second compute node as the relative status arrangement changes (e.g., assets go offline, assets workloads change). Similarly, asset weight values on various compute nodes may change over time which can impact the overall system performance and call for a reorganization via migration.

In embodiments, a usage assessment may be generated with respect to the asset management. Use of the asset management may be metered at block 491. For example, migrations performed may be measured or asset up-time relative to a benchmark (e.g., historical asset up-time) can be evaluated, etc. Such factors may correlate to charge-back or cost burdens which can be defined in-advance (e.g., utilizing usage tiers) or scaled with respect to a market-rate. An invoice or bill presenting the usage, rendered services, fee, and other payment terms may be generated based on the metered use at block 492. The generated invoice may be provided (e.g., displayed in a dialog box, sent or transferred by e-mail, text message, initiated for traditional mail) to the user for notification, acknowledgment, or payment.

Method 400 concludes at block 499. Aspects of method 400 may provide performance or efficiency benefits for asset management with respect to a shared pool of configurable computing resources (e.g., for choosing assets for live migration based on a processing allocation and importance). For example, aspects of method 400 may have positive impacts with respect to load balancing, resource usage, or responsiveness of a shared pool of configurable computing resources. Altogether, performance or efficiency benefits for asset management may occur (e.g., speed, flexibility, load balancing, responsiveness, resource usage, productivity).

Aspects described herein include a methodology that considers a set of asset weight values and a set of asset priority values at a hypervisor level when determining which assets to migrate from a compute node which may not be fully-balanced. As such, the migration may not adversely impact the destination compute node. Also, various high-priority assets may be spread-out (e.g., fanned-out, sprayed) across a plurality of compute nodes to increase reliability and limit potential collateral damage from an error event such as a compute node failure. Data from utilities such as Nagios (trademark of Nagios Enterprises) or Ceilometer can be used to identify when to initiate a corrective action.

For instance, an ordered list of virtual machines ranked by the anticipated reduction in resource utilization that may be achieved by migrating the first virtual machine may be computed. The ordered list can use a calculated resource utilization based on the ratio of the set of asset weight values multiplied by the shared resources of the compute node. The ordered list can be used to migrate one or more virtual machines. Impact of a compute node may be defined as follows:

```
def impact(compute_host)
    #""" Returns the collective impact if a host goes down as an integer
    (smaller numbers correlate to lesser impact; larger numbers correlate to
    more impact)."""
    total_priority := 0
    for each VM on compute_host
        total_priority := total_priority + vm.priority
    return total_priority
```

In certain embodiments, ordering/sorting based on one feature (e.g., utilization reduction) may have performance or efficiency benefits. In various embodiments, ordering/sorting based on a plurality of features may have (further) performance or efficiency benefits. To illustrate:

```
if impact(source_host) > impact(destination_host)
    # the source host may have more important virtual machines than the destination host, so
    balance virtual machine importance to deter/limit collateral damage/challenges from a host
    failure by moving the most/more important virtual machine
        (utilization_reduction_descending_order, asset_weight_value_ascending_order,
    asset_priority_value_descending_order)
else
    # the destination host may have more important virtual machines than the destination host, so
    balance virtual machine importance to deter/limit collateral damage/challenges from a host
    failure by moving the least/lesser important virtual machine
        (utilization_reduction_descending_order, asset_weight_value_ascending_order,
    asset_priority_value_ascending_order).
```

Using such a technique, the virtual machines may be managed to be selected and moved to achieve an arrangement which is more balanced in terms of asset weight values and asset priority values. For instance, the four highest priority assets (by asset priority value) may be evenly distributed such that two are on the first compute node and two are on the second compute node. As another example in response to a first compute node exceeding a processor utilization threshold, a heavily weighted asset (in the top 10% of asset weight values) may be moved to a second compute node which can accept more processor utilization without exceeding its processor utilization threshold.

Figure 5:
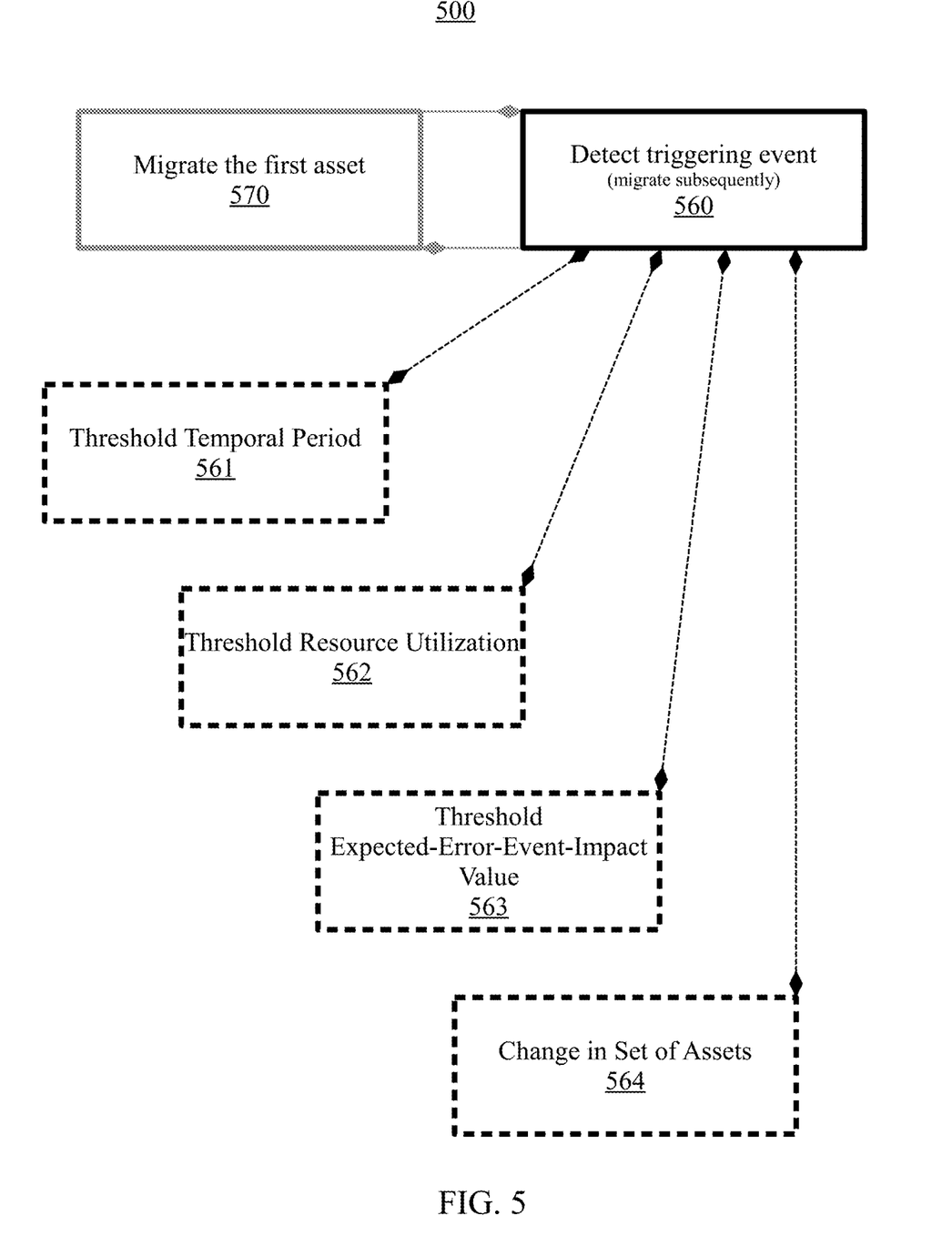
FIG. 5 is a flowchart illustrating a set of asset management operations according to embodiments.

FIG. 5 is a flowchart illustrating a set of asset management operations 500 according to embodiments. The set of asset management operations may relate to determining to migrate or migrating the first asset of the set of assets from the first compute node to the second compute node (e.g., block 570/450/470). At block 560, a triggering event is detected (e.g., sensed, ascertained). The triggering event may occur prior to migrating the first asset (e.g., prior to determining to migrate the first asset). As such, migrating the first asset may occur in response to detecting the triggering event.

In embodiments, the triggering event can include achieving a threshold temporal period (e.g., 24 hours, 10 business days, 3 months, within 5 days after a deployment/migration/error/start-up/shut-down event) at block 561. In embodiments, the triggering event may include achieving a threshold resource utilization (e.g., a compute node reaches 70% processor usage such as in number of cores, a set of compute nodes exceeds 80% memory usage on average such as by allocation, a set of compute nodes all exceed both 60% processor usage and 60% memory usage) at block 562. In embodiments, the triggering event may include achieving a threshold expected-error-event-impact value (e.g., predicted processor/memory/bandwidth burden resulting from a failure to one or more compute nodes, 50% of processors elevated to maximum utilization capacity resulting in at least one more compute node failing, loss of 15% of computing capability resulting in assets not running on schedule or at all thereby decreasing revenue) at block 563. In embodiments, the triggering event may include a change to the set of assets (e.g., a threshold number of virtual machines coming online or going offline, workload increase/decrease, a threshold number of migrations between/among compute nodes) at block 564.

Figure 6:
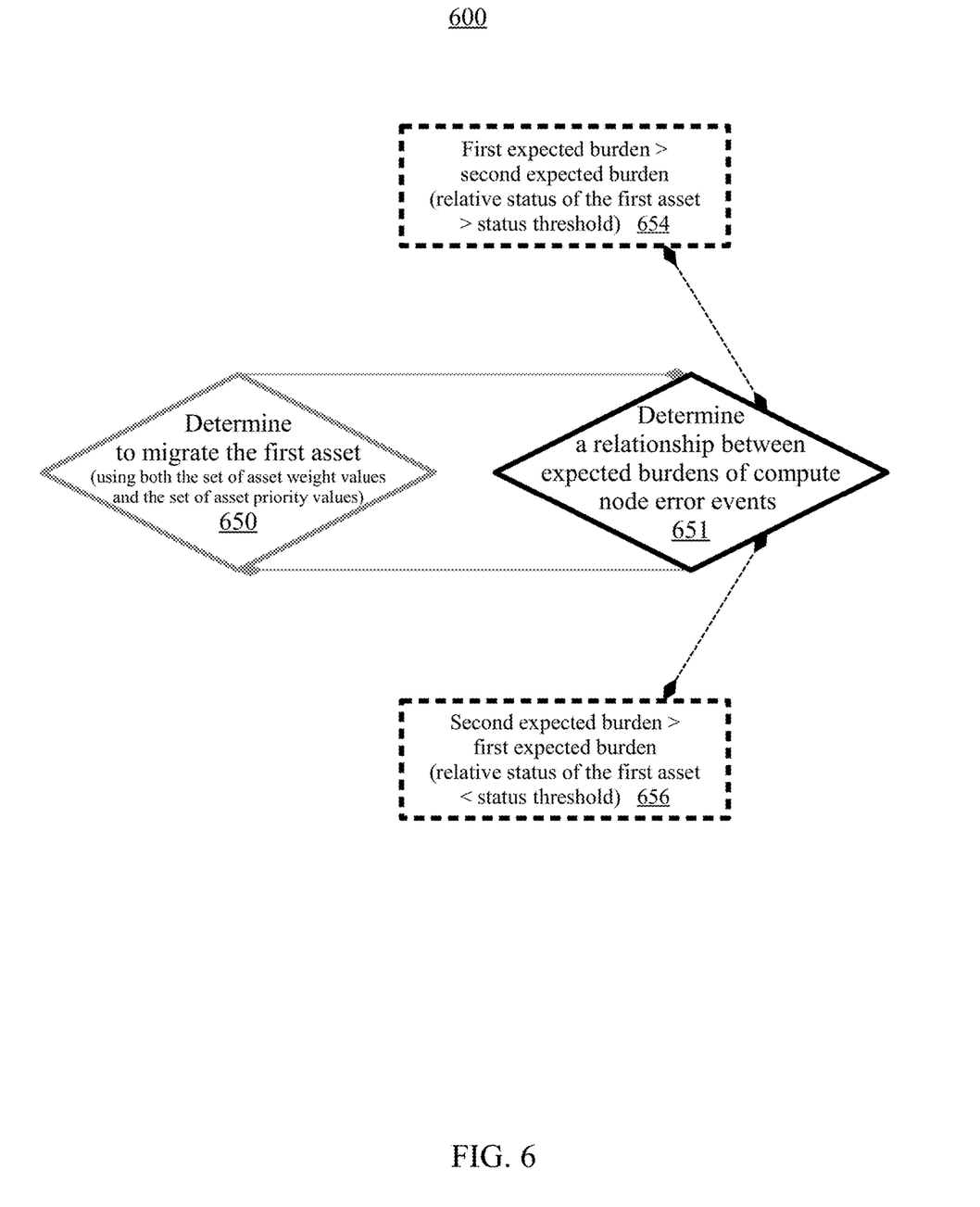
FIG. 6 is a flowchart illustrating a set of asset management operations according to embodiments.

FIG. 6 is a flowchart illustrating a set of asset management operations 600 according to embodiments. The set of asset management operations may relate to determining to migrate the first asset of the set of assets from the first compute node to the second compute node using both the set of asset weight values and the set of asset priority values (e.g., block 650/450). At block 651, by analyzing a combination of assets of both the first and second compute nodes, a relationship may be determined between a first expected burden of a first compute node error event and a second expected burden of a second compute node error event. For instance, analyzing can include extracting (e.g., creating a derivation), examining (e.g., performing an inspection), scanning (e.g., reviewing a sample), evaluating (e.g., generating an appraisal), dissecting (e.g., scrutinizing an attribute), resolving (e.g., ascertaining an observation/conclusion/answer), parsing (e.g., deciphering a construct), querying (e.g., asking a question), searching (e.g., exploring for a reason/ground/motivation), comparing (e.g., relating an assessment), classifying (e.g., assigning a designation), or categorizing (e.g., organizing by a feature). Data analysis may include a process of inspecting, cleaning, transforming, or modeling data to discover useful information, suggest conclusions, or support decisions. Data analysis can extract information/patterns from a data set and transform/translate it into an understandable structure (e.g., a data report which can be provided/furnished) for further use.

For example, analysis may provide a collective impact on the shared pool of configurable computing resources if a particular compute node fails. Such collective impact may be scaled (e.g., from 0-100 with 100 being the most burdensome). Various combinations of multiple compute node failures may also be considered (e.g., to influence an impact score of the particular compute node). A larger asset priority value may indicate a greater burden of failure than a smaller asset priority value. Similarly, a larger asset weight value may indicate a greater burden of failure than a smaller asset priority value. Compute nodes may be compared based on assets on the compute nodes using the set of asset priority values or the set of asset weight values. Various algorithms incorporating weighting coefficients may be used (e.g., 0.7×asset weight value+0.3×asset weight value, (0.9×asset weight value)/(1+asset priority value)). As such, the relationship may be based on the comparison (e.g., failure of compute node A is more burdensome than failure of compute node B, compute nodes A & B are within a threshold difference with respect to burden of failure, failure of the most burdensome 50 compute nodes is significantly different from failure of the least burdensome 50 compute nodes but neither is significantly different from failure of the middle burdensome 50 compute nodes so as to potentially deter use of the middle burdensome 50 compute nodes with respect to migration for the purposes described herein).

In embodiments, the first expected burden of the first compute node error event (e.g., 0.6×30+0.4×50=38) exceeds the second expected burden of the second compute node error event (e.g., 0.6×24+0.4×54=36) at block 654. Also, a first asset priority of the set of asset priority values (e.g., 30) indicates a relative status of the first asset which exceeds a status threshold (e.g., 25, 0) with respect to the relative status arrangement for the set of assets. For example, if the first compute node includes a more important asset than the second compute node, the more important asset may be migrated to the second compute node to balance potential negative/burdensome impact/damage from a compute node failure (which may be predicted to be just as likely to each compute node). Such migration may occur so long as the more important asset has a priority value above the status threshold (e.g., it actually is an important asset to operations which is valuable enough to protect in this manner and not merely a nonessential asset to operations).

In embodiments, the second expected burden of the second compute node error event (e.g., 0.01×100×54=54) exceeds the first expected burden of the first compute node error event (e.g., 0.01×80×65=52) at block 656. Also, a first asset priority of the set of asset priority values (e.g., 80) indicates a relative status of the first asset which does not exceed a status threshold (e.g., 90, 255) with respect to the relative status arrangement for the set of assets. For example, if the first compute node includes a less important asset than the second compute node, the less important asset may be migrated to the second compute node to balance potential negative/burdensome impact/damage from a compute node failure (which may be predicted to be just as likely to each compute node). Such migration may occur so long as the less important asset has a priority value below the status threshold (e.g., it is a lesser-important asset to operations which may be migrated without causing an undue harm/burden to the shared pool of configurable computing resources when migrating).

Figure 7:
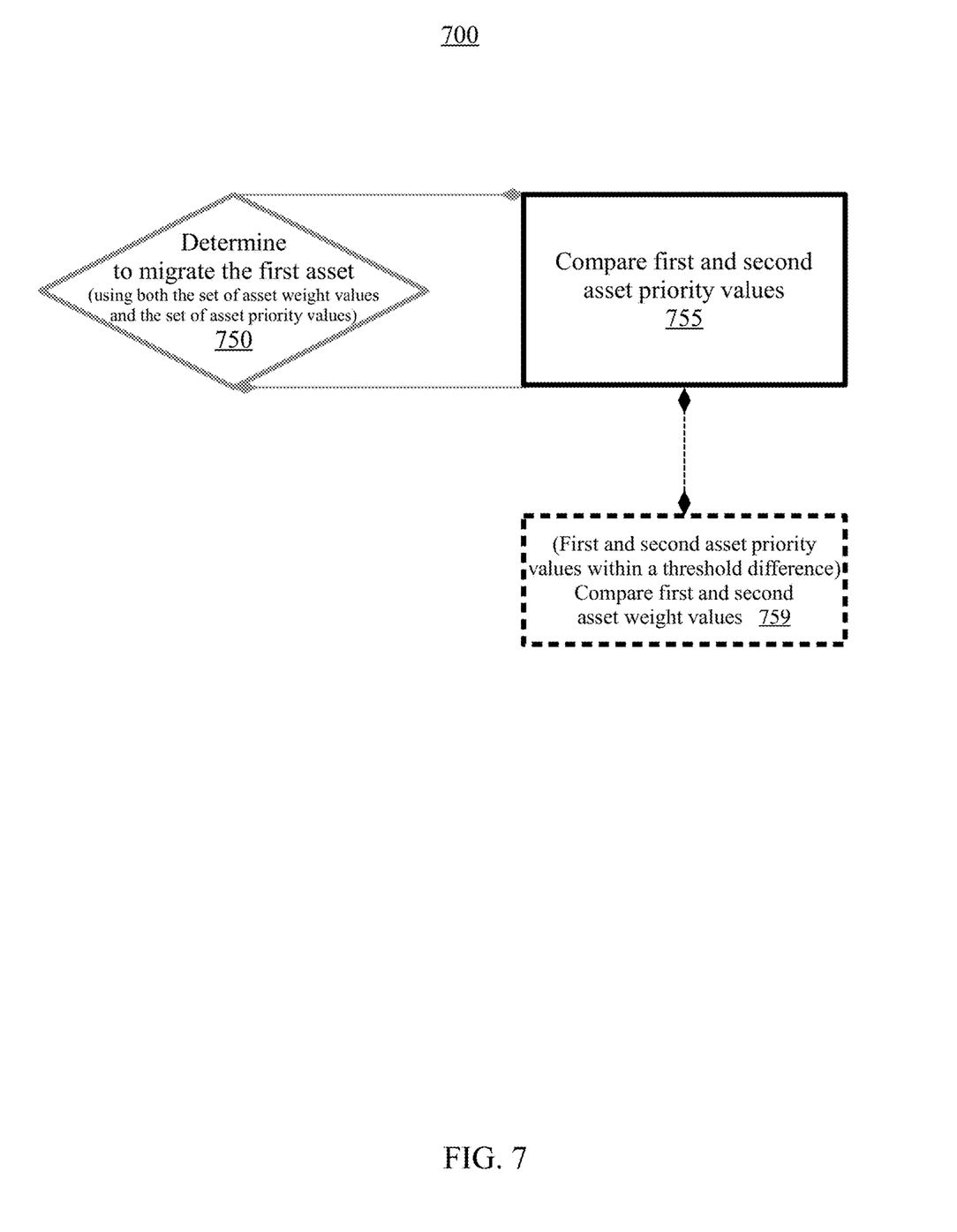
FIG. 7 is a flowchart illustrating a set of asset management operations according to embodiments.

FIG. 7 is a flowchart illustrating a set of asset management operations 700 according to embodiments. The set of asset management operations may relate to determining to migrate the first asset of the set of assets from the first compute node to the second compute node using both the set of asset weight values and the set of asset priority values (e.g., block 750/450/650). At block 755, using the set of asset priority values which indicates the relative status arrangement for the set of assets, a first asset priority value (e.g., 160) of the first asset of the set of assets is compared with a second asset priority value (e.g., 150) of a second asset of the set of assets (e.g., 160>150). In embodiments, the first asset priority value and the second asset priority value are within a threshold difference (e.g., within a numerical value such as 15 of each other, within a percentage such as 20% of each other) at block 759. As such, using the set of asset weight values which indicates a set of utilization shares of the resource by the set of assets, a first asset weight value (e.g., 180) of the first asset of the set of assets may be compared with a second asset weight value (e.g., 170) of the second asset of the set of assets. Accordingly, if a set of primary metrics (e.g., the set of asset priority values) is within the threshold difference, then a set of secondary metrics (e.g., the set of asset weight values) may be utilized to make a determination.

In embodiments, an x86 processor is absent with respect to at least one of the first and second compute nodes. x86 processors may utilize software hypervisors for virtualization. x86 processors can have additional layers with respect to non-x86 processors. In certain embodiments, support for a hypervisor is built into the chip (e.g., embedded firmware managing the processor and memory resources). Accordingly, the hypervisor may run as a piece of firmware code interacting with the hardware and virtual machines.

In addition to embodiments described above, other embodiments having fewer operational steps, more operational steps, or different operational steps are contemplated. Also, some embodiments may perform some or all of the above operational steps in a different order. In embodiments, operational steps may be performed in response to other operational steps. The modules are listed and described illustratively according to an embodiment and are not meant to indicate necessity of a particular module or exclusivity of other potential modules (or functions/purposes as applied to a specific module).

As described herein, aspects of the disclosure are directed toward managing placement of assets (e.g., virtual machines) with respect to one or more hosts based on target/threshold values. In embodiments, the target/threshold values may be specified by a user or system administrator based on available memory or processing resources of a local computing system architecture. Consider the following example. A particular cloud environment including four host devices may be designated to receive placement of a set of six virtual machines. A system administrator of the six virtual machines may submit a resource request with respect to the set of virtual machines that specifies a first set of resource values and a second set of resource values. The first set of resource values may include threshold values that indicate a lower limit of the resources requested from the host devices for allocation to the virtual devices. For instance, the set of threshold values may specify 60 gigahertz of processing power and 40 terabytes of memory. The second set of resource values specified in the resource request may include target values that indicate the desired amount of resources requested for deployment. For instance, the set of target values may specify 100 gigahertz of processing power and 80 terabytes of memory.

Consistent with embodiments described herein, placement for the six virtual machines on the host devices may be determined based on the threshold values and the target values specified in the resource request. The placement of the virtual machines on the host devices may be performed in one or more of a number of ways. In embodiments, the requested resources may be allocated to the 6 virtual machines based on the threshold values and target values specified by the user, as well as a set of asset weight values that indicate a prioritization of the set of assets. For instance, a first virtual machine may be weighted at 38, a second virtual machine weighted at 21, a third virtual machine weighted at 15, a fourth virtual machine weighted at 11, a fifth virtual machine weighted at 8, and a sixth virtual machine weighted at 7. As described herein, the asset weights may indicate a percentage of the requested resources desired for allocation to each virtual machine. Accordingly, a requested resource range may be calculated for each virtual machine using the asset weights, the threshold values, and the target values. For instance, with respect to the requested resource values specified in the example herein, a resource range of 22.8-38.0 gigahertz of processing power and 15.2-30.4 terabytes of memory may be calculated for the first virtual machine (e.g., 38% of both the threshold values and target values specified in the resource request). Similarly, resource ranges of 12.6-21.0 gigahertz and 8.4-16.8 terabytes, 9.0-15.0 gigahertz and 6.0-12.0 terabytes, 6.6-11.0 gigahertz and 4.4-8.8 terabytes, 4.8-8.0 gigahertz and 3.2-6.4 terabytes, 4.2-7.0 gigahertz and 2.8-5.6 terabytes may be calculated for the second, third, fourth, fifth, and sixth virtual machines, respectively. In certain embodiments, separate asset weights may be designated for each the processing power and memory resource requirements. Other resources and asset weights are also possible.

As described herein, the placement arrangement for the virtual machines may be determined based on the calculated resource ranges (e.g., based on the threshold values, target values, and asset weights) with respect to the resources available on each host device. For instance, in certain situations, the first host device may have 35 gigahertz and 15 terabytes available, the second host device may have 18 gigahertz and 24 terabytes available, the third host device may have 27 gigahertz and 20 terabytes available, and the fourth device may have 11 gigahertz and 7 terabytes available. In embodiments, deployment of the virtual machines may prioritize accommodation of the target values (e.g., the high level of the resource range) of each virtual machine. In the event that the target resource values for each virtual machine cannot be accommodated, virtual machines may be placed on hosts with less resource contention, or on a host that achieves the threshold values (e.g., the low level of the resource range). For example, in one example placement arrangement, the first virtual machine may be placed on the third host device and allotted 27 gigahertz and 15 terabytes, the second virtual machine may be placed on the first host device and allotted 21 gigahertz and 9 terabytes, the third virtual machine may be placed on the second host device and allotted 13 gigahertz and 12 terabytes, the fourth virtual machine may be placed on the first host device and allotted 11 gigahertz and 6 terabytes, the fifth virtual machine may be placed on the second host device and allotted 5 gigahertz and 6.4 terabytes, and the sixth virtual machine may be placed on the 4th virtual machine and allotted 7 gigahertz and 5.6 terabytes. Other placement arrangements and methods of determining the placement arrangement of the assets are also possible.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for virtual machine management with respect to a shared pool of configurable computing resources, the method comprising:

identifying, with respect to a set of virtual machines which share a resource on a first compute node, a set of virtual machine weight values which indicates a set of utilization shares of the resource by the set of virtual machines, wherein the resource includes a processor capacity remainder on the first compute node;

identifying, with respect to the set of virtual machines on the first compute node, a set of virtual machine priority values which indicates a relative status arrangement for the set of virtual machines;

determining, using both the set of virtual machine weight values and the set of virtual machine priority values, to migrate a first virtual machine of the set of virtual machines from the first compute node to a second compute node; and migrating the first virtual machine of the set of virtual machines from the first compute node to the second compute node.

2. The method of claim 1, wherein the set of utilization shares indicates an allocation of the processor capacity remainder to the set of virtual machines.

3. The method of claim 1, wherein the migration includes a live migration that is performed by a native operating system, and wherein the resource includes a processor allocation.

4. The method of claim 1, wherein migrating the first virtual machine of the set of virtual machines from the first compute node to the second compute node includes:

migrating, in response to detecting a triggering event, the first virtual machine.

5. The method of claim 4, wherein the triggering event includes a selection from a group consisting of at least one of:

a threshold temporal period is achieved, a threshold resource utilization is achieved, a threshold expected-error-event-impact value is achieved, or the set of virtual machines is changed.

6. The method of claim 1, wherein identifying the set of virtual machine weight values, identifying the set of virtual machine priority values, determining to migrate the first virtual machine, and migrating the first virtual machine each occur in an automated fashion without user intervention.

7. The method of claim 1, wherein determining, using both the set of virtual machine weight values and the set of virtual machine priority values, to migrate the first virtual machine of the set of virtual machines from the first compute node to the second compute node includes:

determining to migrate the first virtual machine to balance, with respect to the first and second compute nodes, the set of virtual machine weight values and the set of virtual machine priority values.

8. The method of claim 1, wherein determining, using both the set of virtual machine weight values and the set of virtual machine priority values, to migrate the first virtual machine of the set of virtual machines from the first compute node to the second compute node includes:

determining to migrate the first virtual machine based on a striping criterion.

9. The method of claim 1, wherein determining, using both the set of virtual machine weight values and the set of virtual machine priority values, to migrate the first virtual machine of the set of virtual machines from the first compute node to the second compute node includes:

determining to migrate the first virtual machine based on a packing criterion.

10. The method of claim 1, wherein determining, using both the set of virtual machine weight values and the set of virtual machine priority values, to migrate the first virtual machine of the set of virtual machines from the first compute node to the second compute node includes:

determining, by analyzing a combination of assets of both the first and second compute nodes, a relationship between a first expected burden of a first compute node error event and a second expected burden of a second compute node error event.

11. The method of claim 10, wherein the first expected burden of the first compute node error event exceeds the second expected burden of the second compute node error event, and wherein a first virtual machine priority of the set of virtual machine priority values indicates a relative status of the first virtual machine which exceeds a status threshold with respect to the relative status arrangement for the set of virtual machines.

12. The method of claim 10, wherein the second expected burden of the second compute node error event exceeds the first expected burden of the first compute node error event, and wherein a first virtual machine priority of the set of virtual machine priority values indicates a relative status of the first virtual machine which does not exceed a status threshold with respect to the relative status arrangement for the set of virtual machines.

13. The method of claim 1, wherein determining, using both the set of virtual machine weight values and the set of virtual machine priority values, to migrate the first virtual machine of the set of virtual machines from the first compute node to the second compute node includes:

comparing, using the set of virtual machine priority values which indicates the relative status arrangement for the set of virtual machines, a first virtual machine priority value of the first virtual machine of the set of virtual machines with a second virtual machine priority value of a second virtual machine of the set of virtual machines.

14. The method of claim 13, wherein the first virtual machine priority value and the second virtual machine priority value are within a threshold difference, further comprising:

comparing, using the set of virtual machine weight values which indicates a set of utilization shares of the resource by the set of virtual machines, a first virtual machine weight value of the first virtual machine of the set of virtual machines with a second virtual machine weight value of the second virtual machine of the set of virtual machines.

15. The method of claim 1, further comprising:
metering use of the virtual machine management; and
generating an invoice based on the metered use.

16. A system for virtual machine management with respect to a shared pool of configurable computing resources, the system comprising:

a memory having a set of computer readable computer instructions, and a processor for executing the set of computer readable instructions, the set of computer readable instructions including:

identifying, with respect to a set of virtual machines which share a resource on a first compute node, a set of virtual machine weight values which indicates a set of utilization shares of the resource by the set of virtual machines, wherein the resource includes a processor capacity remainder on the first compute node;

identifying, with respect to the set of virtual machines on the first compute node, a set of virtual machine priority values which indicates a relative status arrangement for the set of virtual machines;

determining, using both the set of virtual machine weight values and the set of virtual machine priority values, to migrate a first virtual machine of the set of virtual machines from the first compute node to a second compute node; and migrating the first virtual machine of the set of virtual machines from the first compute node to the second compute node.

17. A computer program product for virtual machine management with respect to a shared pool of configurable computing resources, the computer program product comprising a computer readable storage medium having program instructions embodied therewith, wherein the computer readable storage medium is not a transitory signal per se, the program instructions executable by a processor to cause the processor to perform a method comprising:

identifying, with respect to a set of virtual machines which share a resource on a first compute node, a set of virtual machine weight values which indicates a set of utilization shares of the resource by the set of virtual machines, wherein the resource includes a processor capacity remainder on the first compute node, wherein the set of utilization shares indicates an allocation of the processor capacity remainder to the set of virtual machines;

identifying, with respect to the set of virtual machines on the first compute node, a set of virtual machine priority values which indicates a relative status arrangement for the set of virtual machines;

determining, using both the set of virtual machine weight values and the set of virtual machine priority values, to migrate a first virtual machine of the set of virtual machines from the first compute node to a second compute node and determining to migrate the first virtual machine to balance, with respect to the first and second compute nodes, the set of virtual machine weight values and the set of virtual machine priority values, and determining, by analyzing a combination of assets of both the first and second compute nodes, a relationship between a first expected burden of a first compute node error event and a second expected burden of a second compute node error event, wherein the first expected burden of the first compute node error event exceeds the second expected burden of the second compute node error event, and wherein a first virtual machine priority of the set of virtual machine priority values indicates a relative status of the first virtual machine which exceeds a status threshold with respect to the relative status arrangement for the set of virtual machines, and wherein the second expected burden of the second compute node error event exceeds the first expected burden of the first compute node error event, and wherein a first virtual machine priority of the set of virtual machine priority values indicates a relative status of the first virtual machine which does not exceed a status threshold with respect to the relative status arrangement for the set of virtual machines; and migrating, in response to a triggering event, the first virtual machine of the set of virtual machines from the first compute node to the second compute node.

18. The computer program product of claim 17, wherein at least one of:

the program instructions are stored in a computer readable storage medium in a data processing system, and wherein the program instructions were downloaded over a network from a remote data processing system; or the program instructions are stored in a computer readable storage medium in a server data processing system, and wherein the program instructions are downloaded over a network to a remote data processing system for use in a computer readable storage medium with the remote data processing system.

* * * * *